Patented Sept. 1, 1942

2,294,873

UNITED STATES PATENT OFFICE 2,294,873

AMINOTRIAZINE-ALDEHYDE CONDENSATION PRODUCTS

Gaetano F. D'Alelio, Pittsfield, Mass., assignor to General Electric Company, a corporation of New York No Drawing. Application July 1, 1941,
Serial No. 400,649

17 Claims. (Cl. 260—42)

This invention relates to new condensation products and to methods of making the same. The invention is concerned more particularly with self-curing aminoplasts, by which are meant heat-convertible resinous condensation products prepared from amino or amido compounds and having the characteristic property of curing under heat or under heat and pressure to the insoluble, infusible state without the addition of a curing accelerator or catalyst.

This application is a continuation-in-part of my copending application Serial No. 289,273, filed August 9, 1939, now Patent No. 2,281,559, issued May 5, 1942, and assigned to the same assignee as the present invention. In that application I disclosed and claimed new and useful compositions of matter comprising the condensation product of ingredients comprising (1) a non-haloacylated urea, specifically the compound corresponding to the formula $CO(NH_2)_2$, (2) an aliphatic aldehyde, e. g., formaldehyde and (3) a halogenated acylated urea in which at least one halogen atom is attached to at least one of the following carbon atoms: the alpha carbon atom; the beta carbon atom. The present invention is directed to new and useful condensation products wherein an aminotriazine (amidogentriazine) constitutes the nitrogenous compound which is caused to react with an aldehyde in the presence of a halogenated acylated urea of the kind above mentioned.

In the production of aminoplasts it has heretofore been common practice in converting such materials into the insoluble, infusible state to incorporate into the condensation product or into the molding composition a latent or an active (direct) curing catalyst. As pointed out more particularly hereafter, this technique and the final products have not been wholly satisfactory.

I have discovered that self-curing aminoplasts can be produced by condensing an aminotriazine (that is, an aldehyde-reactable aminotriazine), an aldehyde, including polymeric aldehydes and aldehyde-addition products, and a halogenated acylated urea of the above-mentioned class. The initial condensation between the components may be carried out at normal or at elevated temperatures, in the presence or absence of a condensation catalyst and under alkaline, neutral or acid conditions.

The halogenated acylated ureas used in practicing this invention are those ureas in which at least one halogen atom is attached to an alpha carbon atom, a beta carbon atom or to both alpha and beta carbon atoms. An example of such a urea is monochloroacetyl urea,

$ClCH_2CONHCONH_2$

These halogenated acylated ureas are derived from a urea, including thioureas, selenoureas and iminoureas. It is a requisite of these halogenated acylated ureas that they have at least one hydrogen atom attached to a nitrogen atom in the urea grouping. As a result, they are aldehyde-reactable and for purpose of brevity are so termed hereafter and in the appended claims.

In the heat-convertible resinous condensation products of this invention the self-curing property of the product is imparted thereto by creating a resin molecule having this inherent characteristic. This is a discovery of great practical significance. It makes possible the production of molding compositions of uniform curing characteristics, which compositions yield molded articles free from imperfections, such as blisters, discolorations, etc. Such imperfections are due usually to localized curing that often occurs in aminoplasts of the admixed-catalyst type. As the value of the molded article, especially light-colored articles, is materially influenced by its appearance, it is clear that the discovery of any means for decreasing or eliminating entirely the production of imperfect articles that must be scrapped or sold at reduced price is of considerable commercial importance.

The resin syrups and molding compositions of this invention may be stored for long periods of time without material alteration. In marked contrast the prior heat-convertible aminoplasts of the aminotriazine-aldehyde type, more particularly those containing direct or active curing catalysts such as acids, for example hydrochloric, ethyl sulfuric, phthalic, chloroacetic, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be produced rapidly and economically. The cured products have good light stability, excellent water resistance and surface finish and, in general, meet the strength, hardness and other requirements of the particular service application.

In carrying the present invention into effect the condensation reaction between the aldehyde and the other components preferably is started under neutral or alkaline conditions. Neutral conditions may be established by neutralizing (if necessary) either the mixed components or the individual component or components prior to admixture. Any substance yielding an alkaline aqueous solution may be used in obtaining alkaline conditions for the initial condensation reaction. In some cases it may be desirable, in order more quickly to initiate reaction between the starting materials, to add a small amount of a suitable organic or inorganic acid. Thereafter the solution is treated to eliminate acidic conditions due to acid or acid salts. That is, the mass is neutralized or is made alkaline by adding an alkaline substance. The reaction is then caused to proceed further to produce the self-curing aminoplasts of this invention.

In obtaining the neutral, alkaline or acid conditions above described I may use, for example, ammonia, sodium hydroxide or carbonate, calcium hydroxide, methyl amine, diethyl amine, tri-isopropyl amine, ethanol amines, tri-isopropanol amine, etc., mixtures of such alkaline substances, inorganic or organic acids such as hydrochloric, sulfuric, phosphoric, acetic, acrylic, crotonic, malonic, etc., or acid salts such as sodium acid sulfate, monosodium phosphate, monosodium phthalate, etc., or mixtures of acids, of acid salts, or of acids and acid salts.

Various ways may be employed for effecting initial reaction between the components. For example, I may first mix all the reactants and effect condensation between the mixed reactants in the presence or absence of addition agents, as for instance, condensation catalysts, fillers, plasticizers, other natural or synthetic resinous bodies, solvents or diluents, etc. Alternatively, I may add the halogenated acylated urea to a partial condensation product of an aminotriazine and an aldehyde and effect further condensation between the components. In producing such a partial condensation product I prefer to cause the condensation reaction between the aminotriazine and the aldehyde to take place in the presence of a primary condensation catalyst and a secondary condensation catalyst. The primary catalyst advantageously is either an aldehyde-non-reactable, nitrogen-containing basic tertiary compound, e. g., tertiary amines such as trialkyl (for example, trimethyl, triethyl, etc.) amines, triaryl (triphenyl, etc.) amines, etc., or an aldehyde-reactable nitrogen-containing basic tertiary compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, should be a fixed alkali, for instance a carbonate, cyanide or hydroxide of an alkali metal (e. g. sodium, potassium, lithium, etc.).

Another method of effecting reaction between the ingredients comprises first condensing the halogenated acylated urea with the aldehyde, adding the resulting partial condensation product to an aminotriazine-aldehyde partial condensation product and then causing the reaction to proceed further. Or, I may condense or partially condense the halogenated acylated urea with a mol excess of an aldehyde, add an aminotriazine to this condensation product and effect further reaction between the components. Still other ways may be employed in combining the components and in producing the unmodified or modified condensation products of this invention, as will be readily understood by those skilled in the art as the description of the invention proceeds. These condensation reactions may proceed under a wide variety of time, temperature and pressure conditions. The temperature of reaction may vary from room temperature to the reflux temperature of the reactants at reduced, atmospheric or superatmospheric pressures.

The products obtained as described above properly may be designated as intermediate condensation products. They are heat-convertible resinous bodies which alone or mixed with fillers, pigments, dyes, lubricants, plasticizers, etc., may be used, for example, as molding compositions. The modified or unmodified resinous masses are self-convertible under heat or under heat and pressure to the insoluble, infusible state.

Depending upon the particular reactants employed and the particular conditions of reaction, the intermediate condensation products vary from clear, colorless, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentration. These liquid compositions may be used, for instance, as surface coating materials, in the production of paints, varnishes, lacquers, enamels, etc., for general adhesive applications, as anti-creasing agents, in producing laminated articles and for numerous other purposes. The liquid intermediate condensation products also may be used directly as casting resins. Those intermediate products of a gel-like nature may be dried and granulated to form clear, unfilled, heat-convertible resins.

In order that those skilled in the art better may understand how this invention may be carried into effect, the following examples are given by way of illustration. All parts are by weight.

*Example 1*

| | Parts |
|---|---|
| Melamine | 63.0 |
| Aqueous solution of formaldehyde (approx. 37.1% HCHO) | 140.0 |
| Aqueous ammonia (approx. 28% NH₃) | 3.0 |
| Sodium hydroxide in 15 parts water | 0.06 |
| Haloacetyl urea, specifically chloroacetyl urea | 0.50 |

All of the above components with the exception of the chloroacetyl urea (monochloroacetyl urea) were heated together under reflux at the boiling temperature of the mass for 10 minutes. At the end of this time the above-stated amount of chloroacetyl urea was added and the mixture was brought to boiling temperature, thereby causing the chloroacetyl urea to intercondense with the melamine-formaldehyde partial condensation product. The resulting hot resinous syrup was mixed with 67 parts alpha cellulose in flock form and 0.4 part of a mold lubricant, specifically zinc stearate, to form a molding (moldable) compound. The wet compound was dried at 67° C. for 2 hours. Samples of the dried compound were molded at 130° C. under a pressure of 2,000 pounds per square inch. The molded pieces could be removed hot from the mold without distortion. They were exceptionally light in color, had excellent gloss and very good water resistance.

Example 2

The same formula and general procedure were used as described under Example 1. However, in this case all of the components with the exception of the chloroacetyl urea were heated together under reflux at boiling temperature for 18 minutes. The chloroacetyl urea was added to the resulting hot resinous syrup. The mixture was allowed to stand until all of the chloroacetyl urea had dissolved in, or combined with, the melamine-formaldehyde partial condensation product. A molding composition was prepared by mixing the resulting product with 70 parts alpha cellulose and 0.35 part of zinc stearate. The wet compound was heated for several hours at 70° C. to evaporate the excess water and, simultaneously therewith, to cause any unreacted chloroacetyl urea to interact with the melamine-formaldehyde partial condensation product. A sample of the dried compound was molded for 3½ minutes at 137° C. under a pressure of 3,000 pounds per square inch. The molded piece was well-cured throughout and had excellent water resistance, as shown by the fact that it absorbed only 0.33% by weight of water when immersed in boiling water for 15 minutes, followed by immersion in cold water for 5 minutes.

Example 3

|  | Parts |
| --- | --- |
| Melamine | 31.5 |
| Urea | 15.0 |
| Aqueous solution of formaldehyde (approx. 37.1% HCHO) | 100.0 |
| Aqueous ammonia (approx. 28% NH₃) | 3.0 |
| Sodium hydroxide in a small amount of water | 0.06 |
| Chloroacetyl urea (monochloroacetyl urea) | 0.23 |

All of the above components with the exception of the chloroacetyl urea were heated together under reflux at boiling temperature for 20 minutes. The chloroacetyl urea was now added and refluxing was continued for an additional 5 minutes. The resulting syrup was mixed, while hot, with 51 parts alpha cellulose and 0.25 part zinc stearate to form a molding compound. The wet compound was dried at 70° C. until sufficiently dry for molding. A sample of the dried compound was molded for 3½ minutes at 137° C. under a pressure of 3,000 pounds per square inch. The molded piece could be removed hot from the mold cavity without distortion. It was well-cured and absorbed only 0.68% water when tested for water absorption as described under Example 2.

Example 4

|  | Parts |
| --- | --- |
| Melamine | 31.5 |
| Thiourea | 19.0 |
| Aqueous solution of formaldehyde (approx. 37.1% HCHO) | 100.0 |
| Aqueous ammonia (approx. 28% NH₃) | 3.0 |
| Sodium hydroxide in a small amount of water | 0.06 |
| Chloroacetyl urea | 0.24 |

The same procedure was followed in making the resin syrup as described under Example 3. The hot syrup was mixed with 52.3 parts alpha cellulose and 0.26 part zinc stearate. The wet compound was dried at 70° C. A sample of the dried compound was molded for 3½ minutes at 137° C. under a pressure of 3,000 pounds per square inch. The molded piece was pulled hot from the mold. It was well-cured throughout, had a good surface finish and excellent water resistance, as shown by the fact that it absorbed only 0.29% by weight of water when tested for water absorption as described under Example 2.

Example 5

|  | Parts |
| --- | --- |
| Melamine | 47.3 |
| Dicyandiamide | 10.5 |
| Aqueous solution of formaldehyde (approx. 37.1% HCHO) | 120.0 |
| Aqueous ammonia (approx. 28% NH₃) | 3.0 |
| Sodium hydroxide in a small amount of water | 0.06 |
| Chloroacetyl urea | 0.41 |

All of the above components with the exception of the chloroacetyl urea were heated together under reflux at the boiling temperature of the mass for 15 minutes, after which the chloroacetyl urea was added and refluxing was continued for an additional 5 minutes. The hot syrup was mixed with 61.5 parts alpha cellulose and 0.31 part zinc stearate. The wet compound was dried at 70° C. A sample of the dried compound was molded as described under Examples 2, 3 and 4. The molded piece was pulled hot from the mold. It showed a well-cured structure both from surface and cross-sectional views.

Example 6

|  | Parts |
| --- | --- |
| Melamine | 44.1 |
| 4,6-diamino pyrimidyl-2 carbamyl-methyl sulfide | 29.3 |
| Aqueous solution of formaldehyde (approx. 37.1% HCHO) | 105.0 |
| Aqueous ammonia (approx. 28% NH₃) | 3.0 |
| Sodium hydroxide in a small amount of water | 0.06 |
| Chloroacetyl urea | 0.40 |

The same procedure was followed in making the resin syrup, molding compound and molded article as described in Example 5. The molded piece could be removed hot from the mold without distortion. It had a good appearance, was well-cured throughout and had excellent water resistance. It absorbed only 0.34% by weight of water when tested for water absorption as described under Example 2.

Example 7

|  | Parts |
| --- | --- |
| Melamine | 37.8 |
| Syrupy phenol-formaldehyde partial condensation product | 12.0 |
| Aqueous solution of formaldehyde (approx. 37.1% HCHO) | 30.0 |
| Sodium hydroxide in a small amount of water | 0.02 |
| Chloroacetyl urea | 0.50 |

The phenol-formaldehyde partial condensation product was prepared by heating together the following ingredients for 4 hours at 65°–70° C.:

|  | Parts |
| --- | --- |
| Phenol | 90.0 |
| Aqueous solution of formaldehyde (approx. 37.1% HCHO) | 195.0 |
| Potassium carbonate | 2.85 |

The melamine, phenol-formaldehyde partial condensation product, aqueous formaldehyde and aqueous sodium hydroxide solution were heated together under reflux at boiling temperature for 21 minutes, after which the chloroacetyl urea was added and refluxing was continued for an additional 10 minutes. The resulting syrup was mixed with 63.1 parts alpha cellulose and 0.31 part zinc stearate to form a molding compound. The wet compound was dried for approximately 15 hours at room temperature. A sample of the dried compound was molded for 3½ minutes at 137° C. under a pressure of 3,000 pounds per square inch. The molded piece was well-cured throughout and showed good plastic flow during molding.

*Example 8*

|  | Parts |
|---|---|
| Melamine | 63.0 |
| Soya bean protein | 6.3 |
| Aqueous solution of formaldehyde (approx. 37.1% HCHO) | 150.0 |
| Aqueous ammonia (approx. 28% NH₃) | 3.0 |
| Sodium hydroxide in a small amount of water | 0.06 |
| Chloroacetyl urea | 0.30 |

All of the above components with the exception of the chloroacetyl urea were heated together under reflux at boiling temperature for 5 minutes. The chloroacetyl urea was added to the resulting hot resinous syrup, which was then mixed with 75.3 parts alpha cellulose and 0.38 part zinc stearate to form a molding compound. The wet compound was heated for several hours at 70° C. to remove the excess water and, simultaneously therewith, to cause any unreacted chloroacetyl urea to intercondense with the melamine-protein-formaldehyde partial condensation product. A sample of the dried compound was molded for 3½ minutes at 137° C. under a pressure of 3,000 pounds per square inch. The molded piece was very well cured and showed only 0.87% water absorbed when tested for water-absorption characteristics as described under Example 2.

*Example 9*

|  | Parts |
|---|---|
| Trimethylol melamine (crystalline, preformed, melting point 160°–162° C.) | 64.8 |
| Water | 80.0 |
| Aqueous ammonia (approx. 28% NH₃) | 1.8 |
| Sodium hydroxide in a small amount of water | 0.04 |
| Chloroacetyl urea | 0.3 |

All of the above components with the exception of the chloroacetyl urea were heated together under reflux at the boiling temperature of the mass for 19 minutes. The chloroacetyl urea was now added and the resulting product was mixed with 50.5 parts alpha cellulose and 0.25 part zinc stearate. The wet compound was further processed as described in Example 8. Molded pieces produced by molding samples of the dried compound for 3½ minutes at 137° C. under a pressure of 3,000 pounds per square inch were well-cured throughout and showed excellent resistance to water.

If desired, the trimethylol melamine may be intercondensed with the chloroacetyl urea in the absence of either the sodium hydroxide or the ammonia, or in the absence of any alkaline substance.

*Example 10*

|  | Parts |
|---|---|
| Trimethylol melamine (crystalline, preformed, melting point 160°–162° C.) | 54.0 |
| Urea | 15.0 |
| Water | 100.0 |
| Aqueous ammonia (approx. 28% NH₃) | 3.0 |
| Sodium hydroxide in a small amount of water | 0.06 |
| Chloroacetyl urea | 0.3 |

The same procedure was followed in making the resin syrup, molding compound and molded articles as described under Example 9 with the exception that the time of refluxing the components in the absence of the chloroacetyl urea was 13 minutes. Also, 63.2 parts alpha cellulose and 0.32 part zinc stearate were used instead of the amounts employed in making the molding compound of Example 9. The molded pieces were well-cured throughout and showed good plastic flow during molding.

*Example 11*

|  | Parts |
|---|---|
| Trimethylol melamine (crystalline, preformed, melting point 160° to 162° C.) | 43.2 |
| Dimethylol urea (commercial product containing 11% by weight of water) | 27.0 |
| Aqueous ammonia (approx. 28% NH₃) | 2.8 |
| Sodium hydroxide in a small amount of water | 0.05 |
| Chloroacetyl urea | 0.30 |

The same procedure was followed in making the resin syrup, molding compound and molded articles as described under Example 9 with the exception that the time of refluxing the components in the absence of the chloroacetyl urea was 10 minutes. Also, 55.1 parts alpha cellulose and 0.28 part zinc stearate were used instead of the amounts employed in making the molding compound of Example 9. The molded piece was well-cured throughout and had excellent water resistance, as shown by the fact that it absorbed only 0.48% by weight of water when tested for water absorption as described under Example 2. If desired, the trimethylol melamine and dimethylol urea may be intercondensed with the chloroacetyl urea in the absence of either the sodium hydroxide or the ammonia, or in the absence of any alkaline substance.

It will be understood, of course, that the aldehyde-reactable halogenated acylated urea mentioned in the above examples is only by way of illustration and that various other aldehyde-reactable halogenated acylated ureas may be used in carrying this invention into effect. Additional examples of such halogenated ureas are:

N-methyl, N'-(chloroacetyl) urea
N-phenyl, N'-(trichloroacetyl) thiourea
N-methyl, N-(alpha bromopropionyl) urea
N-methyl, N'-phenyl, N'-(beta iodopropionyl) urea
N-(parachlorobenzyl), N'-(alpha, beta dichloropropionyl) urea
N-naphthyl, N'-(alpha chloro, beta bromopropionyl) urea
N-(beta chloroethyl), N-(alpha iodo, beta chloropropionyl) urea
N-(alpha bromoacetyl), N'-(alpha chlorobutyryl) urea
N-(beta chlorobutyryl)-ethyl-allophanate
Alpha dibromopropionyl guanidine
Alpha bromophenylacetyl biuret
N-cyano, N'-(alpha, beta dibromo hydrocinnamyl) urea
Dichloroacetyl urea
Trichloroacetyl urea
Monobromoacetyl urea
Dibromoacetyl urea
Tribromoacetyl urea
Sym. di-(monobromoacetyl) urea
Sym. di-(dibromoacetyl) urea
Sym. di-(tribromoacetyl) urea
Sym. di-(chloroacetyl) urea
Sym. di-(dichloroacetyl) urea
Sym. di-(trichloroacetyl) urea
N-(bromoacetyl), N'-(chloroacetyl) urea Formulas for the above examples of halogenated acylated ureas are given in my copending application Serial No. 289,273, now Patent No. 2,281,559.

It also will be understood that in each of the specific halogenated acylated ureas above mentioned the particular halogen shown in any specific formula may be replaced by some other halogen, care being taken in the choice of the halogen in the light of the properties desired in the final products. For example, when light-colored molded articles are desired, the use of iodo derivatives should be avoided and when the heat-convertible resins are to be used in the production of molding compositions, the fluoro derivatives preferably are avoided.

Where a plurality of halogen atoms are present in the halogenated acylated urea, these may be the same or different. For example, one halogen in the molecule may be chlorine and another, bromine. In this way it is possible to obtain a heat-convertible resin of self-curing characteristics and other properties best adapted to meet a particular molding problem and service application of the finished article.

Likewise, it also will be understood that the aminotriazines named in the above examples are by way of illustration and that any other aldehyde-reactable aminotriazine may be employed. I prefer to use triazines containing either at least one unsubstituted amidogen (—$NH_2$) group or a plurality of partly substituted amidogen groups. Examples of such triazines which may be used in producing the new synthetic materials of this invention are ammeline, ammelide, formoguanamine, 2-amino-1,3,5-triazines and their substitution products; derivatives of melamine, e. g., 2,4,6-trihydrazino-1,3,5-triazine, melam, melon, 2,4,6-triethyltriamino-1,3,5-triazines, 2,4,6-triphenyl-triamino-1,3,5-triazines, etc.; nuclearly substituted aminotriazines, e. g., 1-cyano-2-amino-4,6-dimethyl-1,3,5-triazine, 2-chloro-4,6-diamino-1,3,5-triazine, 6-methyl-2,4-diamino-1,3,5-triazine, 2-alkyl-4-amino-6-hydroxy-1,3,5-triazines (e. g., 2-methyl-4-amino-6-hydroxy-1,3,5-triazine, etc.), 2-aryl-4-amino-6-hydroxy-1,3,5-triazines (e. g., 2-phenyl-4-amino-6-hydroxy-1,3,5-triazines, etc.), 2-phenyl-p-oxy-4,6-diamino-1,3,5-triazine; poly-amino triazines wherein the hydrogen atoms of one or all of the amino groups are partially substituted by other amino groups, e. g., 2,4-diamino-6-hydrazino-1,3,5-triazine, 2-amino-4,6-dihydrazino-1,3,5-triazine, 2,4,6-trihydrazino-1,3,5-triazine, etc.; poly-amino triazines wherein the hydrogen atoms of one or all of the amino groups are partially substituted by other monovalent substituents (e. g., alkyl, aryl, aralkyl, alkaryl, etc.), for instance 2-amino-4,6-diethylamino-1,3,5-triazine, 4-amino-2,6-diphenylamino-1,3,5-triazine, 2-methylamino-4-amino-6-chloro-1,3,5-triazine, 2,4-diamino-6-phenylamino-1,3,5-triazine, 2-amino-4,6-diphenylamino-1,3,5-triazine, symmetrical trialkyl and triaryl melamines; the amidogen 1,2,3-triazines and the amidogen, 1,2,4-triazines, specifically the amino (—$NH_2$) and the carbamyl (—$CONH_2$) and the thiocarbamyl (—$CSNH_2$) 1,2,3- and 1,2,4-triazines. Additional examples of amidogen 1,3,5-triazines are given below:

2,4,6-tricarbamido-1,3,5-triazine
2-(para-benzamide)-4,6-diamino-1,3,5-triazine
4,6-di-(para-benzamide)-2-amino-1,3,5-triazine
2,4,6-tri-(para-benzamide)-1,3,5-triazine Other examples of amidogen triazines are the amidogen 1,2,3- and 1,2,4-triazines corresponding to the above amidogen 1,3,5-triazines. The preferred class of triazine derivatives used in carrying the present invention into effect are the 2,4,6-amidogen-1,3,5-triazines.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, acrolein, methacrolein, crotonaldehyde, benzaldehyde, furfural, etc., mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives of urea, thiourea, selenourea and iminourea, substitued ureas, thioureas, selenoureas and iminoureas (numerous examples of which are given in my copending application Serial No. 377,524, filed February 5, 1941), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of amidogentriazines, numerous examples of which are given in my copending application Serial No. 377,524. Particularly good results are obtained with active methylene-containing bodies such as mono- and di-methylol urea and the methylol malamines, e. g., mono-, di-, tri-, tetra-, penta- and hexa-methylol melamines. Mono- or poly-(N-carbinol) derivatives, specifically the mono- or poly-methylol derivatives, of an aminotriazine may be caused to react with the halogenated acylated ureas used in carrying the present invention into effect, in which case it is not necessary to use an aminotriazine and an aldehyde as individual starting reactants. Mixtures of aldehydes and aldehyde-addition products may be employed, for example mixtures of formaldehyde and methylol compounds such, for instance, as dimethylol urea and trimethylol melamine.

A part of the aminotriazine reactant may be replaced if desired by, for instance, a urea, e. g., urea ($NH_2CONH_2$), thiourea, selenourea, iminourea and aldehyde-reactable substitution products thereof, e. g., methyl urea, phenyl thiourea, etc., by aldehyde-addition products of a urea, e. g., dimethylol urea, etc., or by other organic compounds capable of reacting with an aldehyde, e. g., an amino pyrimidyl carbamyl-alkyl sulfide. Compositions comprising a condensation product of ingredients comprising an aldehyde and certain amino pyrimidyl carbamyl-alkyl sulfides are described and claimed in the copending application of Gaetano F. D'Alelio and James W. Underwood, Serial No. 398,638, filed June 18, 1941, and assigned to the same assignee as the present invention. Numerous examples of compounds embraced by the term "a urea" are given in my copending application Serial No. 289,273, now Patent No. 2,281,559. I may use either a single or a plurality of halogenated acylated ureas with the aminotriazine reactant or with the aminotriazine and urea reactants.

Various aminodiazines, aminodiazoles or aminotriazoles may be used in place of a part of the aminotriazine reactant.

The ratio of the aldehydic reactant to the aminotriazine may be considerably varied but, in general, it is desirable to use at least one mol of an aldehyde for each mol of aminotriazine. In producing the heat-convertible resinous condensation products of this invention, the proportion of the halogenated acylated urea in all cases is at least sufficient to render the resin convertible under heat to an insoluble, infusible state. Ordinarily not exceeding substantially ⅛ mol halogenated acylated urea is used for each mol of aminotriazine. No advantage accrues from using an amount of halogenated acylated urea above the minimum required to secure the desired curing rate. Further, the use of higher amounts of halogenated acylated urea is undesirable for most molding applications because of the greater difficulty in obtaining molded articles of suitable hardness, but may not be objectionable for other applications of the material. Also, in some cases, particularly where high molecular weight halogenated acylated ureas, as for example N-(alpha chlorostearyl) urea, are used, the halogenated acylated urea part of the resin molecule exceeds on a weight basis the aminotriazine portion of the molecule. Consequently, in such cases the inherent characteristics (for example, waxy nature) of the high molecular weight halogenated acylated urea predominate in the resin molecule. This may be objectionable in some applications of the molded part, for example where resistance to the ordinary organic solvents is required.

From the foregoing it will be seen that the particular mol ratio of halogenated acylated urea to the other components is dependent somewhat upon the inherent characteristics and other properties desired in the heat-curable and heat-cured resinous condensation products. The aldehydic reactant may be used, for example, in an amount corresponding to from one to five or six mols thereof for each mol of aminotriazine. Good results usually are obtained by using from 1½ to 3¼ mols of aldehyde, specifically formaldehyde, for each mol of aminotriazine. Taking melamine (an aminotriazine containing three unsubstituted amidogen groups) as illustrative of the aminotriazine, particularly good results are obtained with approximately three mols aldehyde, e. g., formaldehyde, for each mol melamine. If the aminotriazine contains only two unsubstituted amidogen groups (or one unsubstituted and two partly substituted amidogen groups), then one advantageously may use approximately two mols aldehyde for each mol of an aminotriazine. If the aminotriazine contains only one unsubstituted amidogen groups (or two partly substituted amidogen groups), then no particular advantage usually accrues from using much in excess of one mol aldehyde for each mol of such an aminotriazine. When the aldehyde is available for reaction in the form of an aldehyde-addition product such, for instance, as dimethylol urea, trimethylol melamine, etc., then higher amounts of such aldehyde-addition products ordinarily are used, for example, up to ten or twelve mols of such aldehyde-addition product for each mol of the aminotriazine.

When an aldehyde-addition product of an aminotriazine, e. g., trimethylol melamine, is used as a reactant with an aldehyde-reactable halogenated acylated urea of the kind with which this invention is concerned, such aldehyde-addition product functions in a dual capacity in that it provides a source for the introduction of both an aminotriazine and an alkylene bridge, e. g., —$CH_2$—, into the resin molecule. The aldehyde-addition product of the aminotriazine may be used alone or together with an aminotriazine, or with an aldehyde or with both an aldehyde and an aminotriazine.

The properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, butyl, isobutyl, hexyl, etc., alcohols; polyhydric alcohols such as ethylene glycol, diethylene glycol, glycerine, pentaerythritol, polyvinyl alcohol, etc.; amides such as formamide, acetamide, stearamide, acryloamides, benzamides, toluene sulfonamides, benzene disulfonamides and trisulfonamides, adipic diamide, phthalamide, etc.; amines, e. g., ethylene diamine, aniline, phenylene diamine, etc.; phenol and substituted phenols, e. g., the aminophenols, the cresols, the xylenols, the tertiary alkyl phenols and other phenols such as mentioned in my Patent 2,239,441; ketones; nitriles, e. g., acrylonitrile, methacrylonitrile, succinonitrile, etc.; and others. Those modifying agents which are reactable with the aminotriazine, or with the aldehyde or with the reaction product of the aminotriazine and the aldehyde (that is, an aldehyde-addition product of the aminotriazine, e. g., trimethylol melamine) may be incorporated into the composition by mixing all the reactants and effecting condensation therebetween or by various permutations of the reactants as described, for example, in my Patent 2,239,441 with particular reference to reactions involving a phenol, an aliphatic aldehyde and a malonic compound (page 3, column 1, lines 2–24).

The modifying bodies also may take the form of high molecular weight bodies with or without resinous characteristics, for example, hydrolyzed wood products, formalized cellulose derivatives, lignin, protein-aldehyde condensation products, resinous reaction products of aldehydes, for example formaldehyde, with the aminotriazoles (e. g., guanazole, phenyl guanozole, etc.), alone or admixed with, for example, urea, melamine, or urea and melamine, resins obtained by reaction of an aldehyde with the aminodiazines (e. g., 2,4,6-triaminopyrimidine, 2,4-diaminoquinazoline, etc.), with the aminotriazines or with the aminodiazoles, alone or admixed with, for example, urea, melamine or urea and melamine. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers including polyvinyl acetals, specifically polyvinyl formal, etc.

Dyes, pigments, plasticizers, mold lubricants, opacifiers and various fillers (e. g., wood flour, glass fibers, asbestos, including defibrated asbestos, mineral wool, mica, cloth cuttings, etc.)

may be compounded with the resin in accordance with conventional practice to provide molding compositions best fitted to yield molded articles of optimum properties for the particular service application.

The molding compositions of this invention may be molded into a variety of shapes under heat and pressure, more particularly at temperatures of the order of 100° to 200° C., preferably from 120° to 180° C. Molding pressures may be varied considerably, but usually are within the range of 1,000 to 10,000 pounds per square inch, more particularly from 2,000 to 4,000 or 5,000 pounds per square inch.

From the foregoing description it will be seen that the present invention provides new and useful compositions of matter comprising a condensation product (in heat-curable or heat-cured state) of ingredients comprising essentially an aminotriazine (amidogentriazine), e. g., melamine, an aldehyde, e. g., formaldehyde, and at least one halogenated acylated urea in which at least one halogen atom is attached to at least one of the following carbon atoms: the alpha carbon atom; the beta carbon atom. The scope of the invention also includes method features for the production of such condensation products. For instance, one method feature of the invention comprises effecting partial reaction between ingredients comprising an aminotriazine, specifically melamine, and an aldehyde, e. g., formaldehyde (or ingredients comprising a urea, specifically NH$_2$CONH$_2$, an aminotriazine and an aldehyde) in the presence of an alkaline condensation catalyst, specifically a condensation catalyst comprising ammonia and a fixed alkali, adding a small amount of one or more of the herein-described halogenated acylated ureas, e. g., a haloacetyl urea such as a chloroacetyl urea, to the resulting partial condensation product and causing the halogenated acylated urea to intercondense with the said partial condensation product. My invention also provides thermosetting (heat-hardenable) molding compositions comprising a filler, e. g., a cellulosic filler, and a heat-curable condensation product of this invention, e. g., a heat-hardenable (heat-curable) condensation product of ingredients comprising melamine (or urea and melamine), formaldehyde or compounds engendering formaldehyde and an alpha-halogenated, a beta-halogenated or an alpha and beta-halogenated acylated urea, as well as molded articles of manufacture comprising the heat-set molding compositions.

The modified or unmodified resinous compositions of this invention have a wide variety of uses. For example, in addition to their use in the production of molding compositions, they may be employed as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What I claim as new and desire to secure by Letters Patent of the United States is:

1. A composition of matter comprising the condensation product of ingredients comprising an amino-triazine, an aldehyde and an aldehyde-reactable halogenated acylated urea in which at least one halogen atom is attached to at least one of the following carbon atoms: the alpha carbon atom; the beta carbon atom.

2. A composition as in claim 1 wherein the condensation product is an acohol-modified condensation product of the stated components.

3. A composition as in claim 1 wherein the amino-triazine is melamine.

4. A heat-curable resinous condensation product of ingredients comprising an aminotriazine, formaldehyde and an aldehyde-reactable halogenated acylated urea in which at least one halogen atom is attached to at least one of the following carbon atoms: the alpha carbon atom; the beta carbon atom.

5. A product comprising the cured resinous condensation product of claim 4.

6. A composition comprising the product of reaction of (1) a partial condensation product of ingredients comprising an aminotriazine and an aldehyde, and (2) an aldehyde-reactable halogenated acylated urea in which at least one halogen atom is attached to at least one of the following carbon atoms: the alpha carbon atom; the beta carbon atom.

7. A resinous composition comprising the product of reaction of (1) a partial condensation product obtained by reaction, while admixed with an alkaline substance, of ingredients comprising melamine and formaldehyde, and (2) a haloacetyl urea.

8. A resinous composition obtained by reaction of ingredients comprising melamine, formaldehyde and a chloroacetyl urea.

9. A resinous composition comprising the product of reaction of ingredients comprising urea, melamine, formaldehyde and monochloroacetyl urea.

10. A composition comprising the product of reaction of ingredients comprising a methylol melamine and a chloroacetyl urea.

11. A composition comprising the resinous product of reaction of ingredients comprising trimethylol melamine, dimethylol urea and a chloroacetyl urea.

12. A heat-curable resinous condensation product of ingredients comprising urea, melamine, formaldehyde and an aldehyde-reactable halogenated acylated urea in which at least one halogen atom is attached to at least one of the following carbon atoms: the alpha carbon atom; the beta carbon atom.

13. A product comprising the cured resinous condensation product of claim 12.

14. A thermosetting molding composition comprising a filler and a heat-hardenable resinous condensation product of ingredients comprising an aminotriazine, formaldehyde and a chloroacetyl urea.

15. An article of manufacture comprising the heat-set molding composition of claim 14.

16. The method of preparing new condensation products which comprises effecting reaction between ingredients comprising an aminotriazine, an aldehyde and an aldehyde-reactable halogenated acylated urea in which at least one halogen atom is attached to at least one of the following carbon atoms: the alpha carbon atom; the beta carbon atom.

17. The method which comprises effecting partial reaction between ingredients comprising melamine, urea and formaldehyde in the presence of a condensation catalyst comprising ammonia and a fixed alkali, adding a small amount of a chloroacetyl urea to the resulting partial condensation product, and causing the chloroacetyl urea to intercondense with the said partial condensation product.

GAETANO F. D'ALELIO.